US012679308B2

(12) United States Patent
    Koch et al.

(10) Patent No.:      US 12,679,308 B2
(45) Date of Patent:          Jul. 14, 2026

(54) CLEANING SYSTEM FOR A SENSOR ARRANGEMENT

(71) Applicant: AGCO Corporation, Duluth, GA (US)

(72) Inventors: Jared J. Koch, Valley Center, KS (US); Manish Naryal, Hesston, KS (US)

(73) Assignee: AGCO Corporation, Duluth, GA (US)

( * ) Notice:   Subject to any disclaimer, the term of this patent is extended or adjusted under 35 U.S.C. 154(b) by 51 days.

(21) Appl. No.:   18/853,693

(22) PCT Filed:   Apr. 4, 2023

(86) PCT No.:   PCT/IB2023/053410
    § 371 (c)(1),
    (2) Date:   Oct. 2, 2024

(87) PCT Pub. No.:   WO2023/203413
    PCT Pub. Date: Oct. 26, 2023

(65)            Prior Publication Data
    US 2025/0222902 A1       Jul. 10, 2025

Related U.S. Application Data

(60) Provisional application No. 63/363,348, filed on Apr. 21, 2022.

(51) Int. Cl.
    *B60S 1/56*          (2006.01)
    *A01D 41/127*        (2006.01)
    *B60S 1/54*          (2006.01)
(52) U.S. Cl.
    CPC ............ *B60S 1/56* (2013.01); *A01D 41/1273* (2013.01); *B60S 1/54* (2013.01)

(58) Field of Classification Search
    CPC ........... B60S 1/56; B60S 1/54; A01D 41/1273
    See application file for complete search history.

(56)            References Cited

U.S. PATENT DOCUMENTS 7,670,218 B2    3/2010   Behnke et al.
    7,713,115 B2    5/2010   Behnke et al.
    9,560,802 B1    2/2017   Palla et al.
            (Continued)

FOREIGN PATENT DOCUMENTS

DE        10347623 B4      7/2015
    EP         1491082 B1      5/2006
    JP       2022012000 A      1/2022

OTHER PUBLICATIONS

UK Intellectual Property Office, Search Report for related UK Application No. GB2206510.6, dated Oct. 27, 2022, 3 pages.
            (Continued)

*Primary Examiner* — Naeem Taslim Alam

(57)            ABSTRACT

Systems and methods are provided for controlling a cleaning system for a sensing arrangement of an agricultural machine. Utilizing operational data indicative of an output from the sensing arrangement and/or an operational parameter for the agricultural machine, a cleaning strategy for the cleaning system of the sensing arrangement is determined. The invention extends to controlling one or more operable components associated with the cleaning system for controlling the cleaning system in accordance with the cleaning strategy.

18 Claims, 3 Drawing Sheets

(56) References Cited

U.S. PATENT DOCUMENTS

| | | | |
|---|---|---|---|
| 2009/0313962 A1* | 12/2009 | Talbi ..................... | G02B 6/0055 |
| | | | 56/10.2 R |
| 2015/0168187 A1* | 6/2015 | Myers ....................... | G01F 1/30 |
| | | | 73/861.73 |
| 2016/0338262 A1* | 11/2016 | Liu ........................... | B08B 5/02 |
| 2017/0049045 A1 | 2/2017 | Wilken et al. | |
| 2018/0053067 A1* | 2/2018 | Walker ............... | A01D 41/1273 |
| 2019/0335572 A1* | 10/2019 | Han ........................ | G01S 7/497 |
| 2020/0367484 A1* | 11/2020 | Vedder ................ | A01M 7/0057 |
| 2021/0063547 A1 | 3/2021 | Middelberg et al. | |
| 2021/0088780 A1* | 3/2021 | Henry ................ | G02B 27/0006 |
| 2022/0394925 A1* | 12/2022 | Missotten .......... | A01D 41/1271 |
| 2024/0315158 A1* | 9/2024 | Miyashita .............. | G05D 1/243 |

OTHER PUBLICATIONS

European Patent Office, Search Report for related PCT Application No. PCT/IB2023/053410, dated 28 AGO 2023, 13 pages.

\* cited by examiner

CLEANING SYSTEM FOR A SENSOR ARRANGEMENT

CROSS-REFERENCE TO RELATED APPLICATIONS

This application claims the benefit of International Patent Application PCT/IB2023/053410, "A Cleaning System for a Sensor Arrangement" filed Apr. 4, 2023, which claims the benefit of U.S. Provisional Patent Application 63/363,348, "A Cleaning System for a Sensor Arrangement," filed Apr. 21, 2022, the entire disclosure of which is incorporated herein by reference.

FIELD

Embodiments of the present disclosure relate generally to means to determine a cleaning strategy for a cleaning system of a sensing arrangement, and in particular for a sensing arrangement for an agricultural machine.

BACKGROUND

It is known to utilise sensing arrangements within crop flows within an agricultural machine, such as a harvesting machine for example, to monitor one or more parameters of said crop flow and deduce information therefrom, e.g. a measure of grain yield or loss. Such sensing arrangements may use cameras or other vision based sensors to monitor the crop flow. Alternatively, they may utilise impact type sensors. In either case, the sensor(s) use typically include a sensing region, e.g. an impact surface or lens which may be exposed to the crop flow.

By the nature of agricultural operations being monitored, such sensing regions are susceptible to becoming plugged or otherwise blocked with material. In turn, this results in an incorrect reading for the monitored parameter which is presented to an operator or indeed sent to relevant control units for automated features of the machine.

To address this, the material which blocks the sensing region is often required to be manually removed by an operator. At best this is a nuisance for the operator, but in turn leads to increased downtime for the machine and ultimately reduced efficiency in performing the operation.

It is therefore an aim of an embodiment or embodiments of the invention to address at least the problems discussed herein.

BRIEF SUMMARY

In an aspect of the invention there is provided a control system for a sensing arrangement of an agricultural machine, the control system comprising one or more controllers, and being configured to: receive operational data indicative of an output from the sensing arrangement and/or an operational parameter for the agricultural machine; determine, in dependence on the received operational data, a cleaning strategy for a cleaning system of the sensing arrangement; and generate and output a control signal for controlling one or more operable components associated with the cleaning system for controlling the cleaning system in accordance with the cleaning strategy.

Advantageously, the present invention is configured to utilise data relating to the operation of the agricultural machine to determine a cleaning strategy for the cleaning system such that a cleaning operation is performed according to any operational requirements of the machine. For instance, in embodiments wherein the machine comprises a harvester, it may be disadvantageous to perform a cleaning operation for the sensing arrangement when the machine is actively harvesting crop. As such, the present invention is configured in a manner whereby the cleaning strategy is determined and ultimately performed in dependence on operational data for the sensing arrangement itself and/or the machine as a whole.

The one or more controllers may collectively comprise an input (e.g. an electronic input) for receiving one or more input signals. The one or more input signals may comprise the operational data from the sensing arrangement and/or data indicative of the operational parameter for the agricultural machine. The one or more controllers may collectively comprise one or more processors (e.g. electronic processors) operable to execute computer readable instructions for controlling operational of the control system, for example, to determine the cleaning strategy for the sensing arrangement. The one or more processors may be operable to generate one or more control signals for controlling operation of the one or more operable components. The one or more controllers may collectively comprise an output (e.g. an electronic output) for outputting the one or more control signals.

The sensing arrangement may comprise a grain loss sensor. The grain loss sensor may be positioned in a material flow path within the machine. For example, the grain loss sensor may be positioned downstream of a threshing and cleaning apparatus of the machine. The grain loss sensor may be configured to obtain a measure of an amount of grain contained within the material flowpath.

The cleaning strategy may comprise controlling operation of the one or more operable components in a manner so as to reduce a build-up of material on a surface of the sensing arrangement, such as a lens or impact surface, for example.

The one or more operable components may comprise an airflow system for the machine, and the cleaning strategy may comprise controlling an airflow generated by the airflow system. For example, the control system may be configured to control performance of a cleaning strategy whereby an airflow generated by the system is increased. Advantageously, an increased airflow may be used to move or dislodge material from a sensing surface or lens of the sensing arrangement.

The one or more operable components may comprise a crop processing mechanism of the machine. The cleaning strategy may comprise controlling an opening or the like associated with one or more operable components of the crop processing mechanism, e.g. a sieve opening. For example, the control system may be configured to control performance of a cleaning strategy whereby an opening or openings associated with a sieve of the crop processing mechanism is increased.

The operational parameter for the machine may comprise a location of the machine within a working environment. For example, the control system may be configured to control performance of a cleaning operation for the sensing arrangement in dependence on the machine being located within a headland of the working environment. Accordingly, the control system may be configured to control the cleaning system in a manner so as to only perform a cleaning operation when the machine is located within a headland of the working environment, thereby reducing the impact of the cleaning operation on the working operation of the agricultural machine. Such a scenario may be encountered whereby the system performs a cleaning operation whilst the machine is actively harvesting and processing crop material which may negatively impact successful collection of grain and the like from the crop material.

The location of the machine may be determined using location data received from a positioning system associated with the machine. This may include a global positioning system, such as a satellite based positioning system. Additionally or alternatively, this may include a local positioning system, which may be configured in a manner such that the location of the machine with respect to a local base unit of the positioning system can be determined.

In some embodiments, the location of the machine may be determined upon receipt of an operator input. For example, an operator may be asked to press a button or otherwise interact with a user interface associated with the agricultural machine to indicate when the machine has entered a headland of the working environment. The control system may be configured to receive an operational data indicative of this operator input and determine the cleaning strategy in dependence thereon. For example, the control system may be configured to initiate performance of the cleaning strategy upon receipt of the operator input.

In embodiments, the control system may be configured to receive the operational data in the form of sensor data from one or more environment sensors associated with the machine. This may include one or more cameras or other vision based sensors configured for monitoring the environment of the agricultural machine. The control system may comprise or may be operably connected to an image processing module for determining, from the sensor data received from the environment sensor(s), the location of the machine with respect to the working environment. For instance, the control system may be configured to determine, or receive information indicative of a determination thereof, e.g. from the image processing module, the position of a crop engaging component of the machine, e.g. a header or the like, with respect to crop or other material in the working environment. Where the crop engaging component is determined to be spaced from the crop or other material then a determination may be made that the machine is within a headland of the environment, or is otherwise not engaging crop within the environment, and as such a cleaning strategy may be performed without negatively impacting the overall working operation of the machine.

In embodiments, the operational parameter for the machine may comprise a measure of a throughput of material in one or more material flowpaths within the machine. In an example, this may comprise a flow rate of material within the machine, and may include data from one or more throughput sensors positioned within said flowpath(s). The control system may be configured to receive data indicative of a yield flow rate for the machine.

The control system may be configured to compare the measured flow rate with a threshold flow rate, and determined the cleaning strategy in dependence thereon. This may include determining a cleaning strategy whereby the control system causes performance of a cleaning operation for the sensing arrangement in dependence on the monitored flow rate being less than, or upon the monitored flow rate dropping below, the threshold flow rate, which may be indicative of the machine being located within, or passing into, a headland of the working environment.

The operational parameter for the machine may comprise a measure of a pitch, roll or tilt angle of the machine, which may be indicative of an expected throughput of material through the machine.

The control system may be configured to monitor the output of the sensing arrangement and to determine a need for performance of the cleaning strategy in dependence on that output. For instance, where the sensing arrangement comprises a loss sensor, the control system may be operable to monitor an incidence rate or the like of kernel detection by the loss sensor. The control system may be configured to determine a cleaning strategy in dependence on the monitored incidence rate. For instance, the control system may be configured to determine a need for performance of a cleaning strategy in dependence on a reduction in incidence rate for the loss sensor. The control system may be configured to compare the monitored incidence rate with a threshold incidence rate and determine the need for performance of the cleaning strategy and/or initiate performance of the cleaning strategy in dependence on this comparison. The threshold incidence rate may be predetermined, may be dependent on an average incidence rate for the loss sensor and/or may be determined in dependence on an operator input.

The control system may be operable to receive sensor data from one or more further sensors monitoring one or more further crop parameters. The one or more further crop parameters may include a moisture level associated with the material collected by the agricultural machine during performance of an agricultural operation. The one or more further crop parameters may include a measure of a crop yield or throughput. The control system may be configured to determine the cleaning strategy for the sensing arrangement in dependence on the one or more further crop parameters.

The control system may be operable to determine the cleaning strategy for the sensor arrangement in dependence on one or more environmental parameters. Sensor data indicative of said environmental parameter(s) may be received by the control system, e.g. at one or more inputs of the control system. The one or more environmental parameters may include an ambient temperature, or a measure of a humidity level, for example.

The control system may be configured to automate performance of the cleaning strategy in dependence on one or more operating conditions being met. The operating condition(s) may comprise or be dependent on the output from the sensing arrangement and/or the operational parameter for the agricultural machine. In embodiments, the control system may be operable to automate performance of the cleaning strategy in dependence on the location of the machine. For example, in some embodiments the control system is configured to automate performance of the cleaning strategy in dependence on the machine being located within or entering a headland of the working environment.

The control system may be configured to schedule performance of the cleaning strategy. For example, the control system may be configured to periodically perform, or at least recommend performance of, the cleaning strategy.

The one or more operable components may comprise a user interface such as a display screen or the like provided within (e.g. a fixed display screen within an operator cab of the machine) or otherwise associated with (e.g. as a separate portable device, phone, tablet computer or the like) for providing an indication to an operator of the machine of a need or suggestion to perform the cleaning strategy. The control system may be configured to receive an operator input, e.g. via the user interface, for initiating performance of the cleaning strategy. This may be in response to an operator indicator provided by the control system, or upon a manual override by the operator, or example.

In embodiments, the control system may be configured to determine the cleaning strategy in dependence on one or more machine parameters. This may include the type of machine, size of machine, intended operational use for the machine, or component setup. This may be pre-programmed into the processing module of the control system, or may be input by an operator of the machine.

A further aspect of the invention provides a cleaning system for sensing arrangement of an agricultural vehicle comprising and/or being controllable by the control system of any preceding aspect.

A further aspect of the invention provides a sensing arrangement comprising one or more sensor units and the cleaning system of the preceding aspect of the invention.

In another aspect of the invention there is provided an agricultural machine comprising the control system, cleaning system and/or sensing arrangement of any preceding aspect.

The agricultural machine may comprise a tractor or a harvesting machine. The agricultural machine may comprise a combine harvester or a forage harvester, for example.

A further aspect of the invention provides a method of controlling a cleaning system for a sensing arrangement of an agricultural machine, comprising: receiving operational data indicative of an output from the sensing arrangement and/or an operational parameter for the agricultural machine; determining, in dependence on the received operational data, a cleaning strategy for the cleaning system of the sensing arrangement; and controlling one or more operable components associated with the cleaning system for controlling the cleaning system in accordance with the cleaning strategy.

The method may comprise performing any one or more of the functionalities of the control system described herein-above.

A further aspect of the invention provides computer software comprising computer readable instructions which, when executed by one or more electronic processors, causes performance of a method in accordance with any aspect described herein.

A yet further aspect of the invention provides a computer readable medium having the computer software of the preceding aspect of the invention stored thereon.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

One or more embodiments of the invention/disclosure will now be described, by way of example only, with reference to the accompanying drawings, in which.

DETAILED DESCRIPTION

The present invention, in general, relates to systems and methods for controlling a cleaning system associated with a sensing arrangement of an agricultural machine. As discussed herein, operational data indicative of an output from the sensing arrangement and/or an operational parameter for the agricultural machine is used to determine a cleaning strategy for the cleaning system. The cleaning strategy may include one or more actions for cleaning a sensing surface, e.g. an impact surface for an impact type sensor or lens for a vision based sensor-see below. Operable components of the cleaning system are controlled through generation and output of control signals, e.g. from a control unit associated with the sensing arrangement or cleaning system specifically, for performance of the determined cleaning strategy.

Harvester

Figure 1:
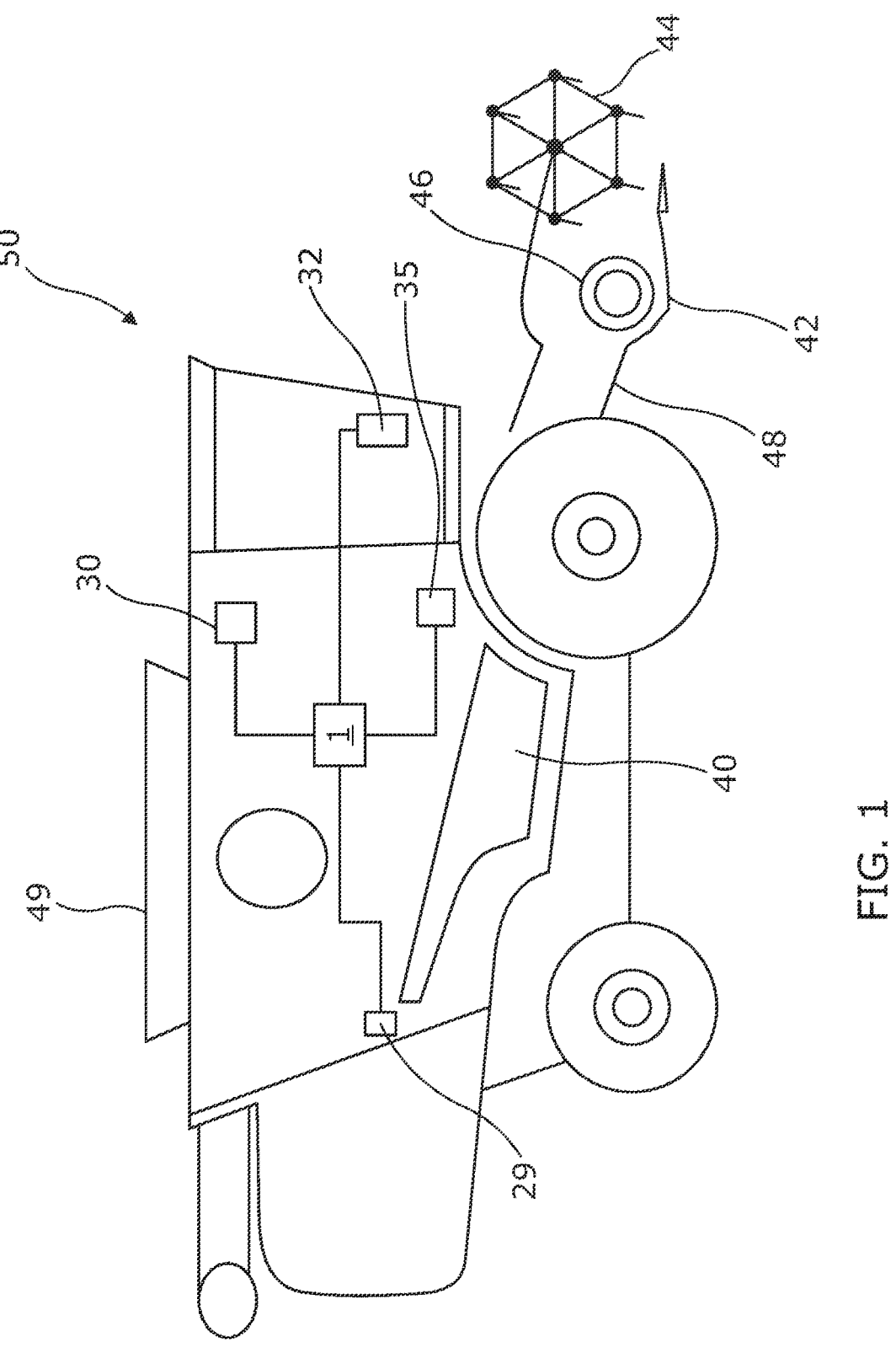
FIG. 1 is a simplified cross-sectional side view illustrating a harvester embodying aspects of the present disclosure.

FIG. 1 illustrates an agricultural machine, specifically a combine harvester 50 (referred interchangeably herein as a "combine", a "harvester" or a "combine harvester"), embodying aspects of the present disclosure.

The combine 50 is coupled to a header 42 which is operable, in use, to cut and gather a strip of crop material as the combine 50 is driven across a field or region to be harvested during a harvesting operation. The header 42 includes a reel 44 for gathering crop material into the header 42, and auger 46 for transferring cut crop material inwardly towards a conveyor section 48 for conveying the cut crop material from the header 42 into a crop processing apparatus 40. The crop processing apparatus 40 serves the function to clean and separate grain and non-grain (i.e. material other than grain (MOG), typically straw and chaff) as will be appreciated. It is noted here that apparatus for separating grain and non-grain material are well-known in the art and the present invention is not limited in this sense. The skilled person will appreciate that numerous different configurations for the crop processing apparatus 40 may be used as appropriate. Clean grain separated from the cut crop material is collected in a grain bin 49, which may be periodically emptied, e.g. into a collection vehicle, storage container, etc. utilising an unloading auger.

Combine 50 additionally includes an airflow system including fan arrangement 35 for generating an airflow through the combine 50, and specifically through the crop processing apparatus 40. This is utilised to move the fed material through/along the crop processing apparatus 40, although as described herein, can be utilised for performance of a cleaning strategy in accordance with the disclosure.

The remaining material, made up largely of non-grain material or MOG, is separately moved to a spreader tool which is operable in use to eject the material from the rear of the combine 50 and onto the ground.

The spreader tool includes an inlet into which material is passed from one or more further components of the combine 50. The spreader tool additionally includes an outlet through which the material is deposited from the combine 50 and onto the field/region being harvested by the combine 50. Rotor units are typically provided as part of the spreader tool for providing a propulsive force for propelling the material from the spreader tool and out of the combine 50. For example, rotor units may each include a plurality of blades which interact with the material to propel the material through outlet, where the speed of rotation of the rotor units can be controlled for controlling the propulsive force provided to the material—i.e. the speed at which the material is propelled from the combine 50. Deflector plates or other steering mechanisms may also be provided for controlling a direction at which the material is deposited from the combine 50. A chopper tool may also be included positioned between the crop processing apparatus 40 and the spreader tool and operable, in use, to cut material before it is spread by the spreader tool 40. Typically, a chopper tool includes an inlet into which material may enter an operational enclosure of the chopper tool and a series of blades positioned within the enclosure and each comprising a cutting edge thereon, with the blades being rotatable to provide a cutting action as the material is passed through the chopper tool.

It will be appreciated that the efficiency of the separating and cleaning steps performed by the crop processing apparatus 40 may affect the constituents of the material deposited out of the combine 50. In an ideal scenario, all of the grain contained within the crop material collected by the combine 50 will be separated from the MOG, and only MOG will be deposited via the spreader tool, however, in most instances there will be grain contained within this material. Accordingly, by obtaining a measurement of an amount of grain contained within the material being deposited from the combine 50, a measurement of grain loss from the combine, and in particular associated with the separating and cleaning steps of the harvesting process, can be obtained.

Accordingly, the combine 50 includes a sensing arrangement which includes a sensing unit 29 for obtaining a measurement of an amount of grain contained within material passing from the crop processing apparatus 40 and into the chopper and spreader tools, this being a measure of an amount of grain which has not been successfully separated from the crop material and hence a measure of grain loss associated with the crop processing apparatus 40. The sensing unit 29 is an impact type sensor and includes a detection surface, discussed in detail herein. The sensing unit 29 is positioned within the flow path of material through the combine 50 and specifically downstream of the crop processing apparatus 40 such that material is incident on the detection surface.

In use, the sensing unit 29 is configured to measure an impact parameter indicative of a force and/or frequency of material incident on the detection surface. Grain can be distinguished from other material incident on the detection surface through analysis of the signal produced upon impact of material therewith. In general, due to the kernels of grain being much harder than the straw and chaff, impacts of the kernels with a detection surface have a characteristic sensor response, namely a fast rise time, with a generally higher amplitude when compared with sensor response associated with the impact of straw and/or chaff with the detection surface of the sensing unit 29. Therefore, by measuring the force and/or frequency of such impacts, and in particular those associated with grain incident on the detection surface, it is possible to determine a measurement or at least a prediction of the amount of grain present in the material.

Due to the position and operational use of the sensing unit 29 it is common for the detection surface to become blocked or obscured by material which becomes stuck or builds up on or about the detection surface. This may include a build up of material directly on the detection surface and/or on one or more components proximal to the detection surface. In turn, this prevents an accurate grain loss reading being obtained using the sensing unit 29. At best, this serves as an annoyance for an operator of the combine 50 who would be required to clean the detection surface manually to make use of the sensing unit 29. However, it is also common to use the output of such sensors and the measure of grain loss to automate control over other aspects of the combine operation, e.g. to increase the efficiency of the harvesting process. Accordingly, a blocked grain loss sensor can be detrimental to the operator in many ways.

Turning back to FIG. 1, combine 50 additionally includes a positioning module 30 operable to receive signals from a global positioning system (e.g. GPS, GLONASS, etc.) for determining a position of the combine 50 within a working environment. As is discussed herein, the position of the combine 50 may be used to determine the cleaning strategy for the sensor arrangement, e.g. to initiate performance of the strategy at an appropriate location within the working environment. Additionally or alternatively, positioning module 30 may form part of a local positioning system for the combine 50, which may include a base station or the like positioned within the environment which together with the positioning module 30 may be configured to determine the relative position of the combine 50 within the environment.

The combine 50 also includes, amongst other features, an operator cab, wheels, engine and a user interface 32. As will be discussed in detail herein, the combine 50 embodies a control system 1 operable to control operation of one or more systems of the combine 50.

Cleaning Strategy

The cleaning strategy is determined in dependence on operational data indicative of an output from the sensing arrangement, e.g. from sensing unit 29 and/or an operational parameter for the combine 50.

Here, the operational parameter for the combine 50 includes a location of the machine within a working environment as determined through use of positioning module 30 and the data obtained therefrom. The illustrated embodiment advantageously controls the cleaning system in a manner so as to only perform a cleaning operation when the combine 50 is located within a headland of the working environment, thereby reducing the impact of the cleaning operation on the working operation of the combine 50.

Operational data from the sensing unit 29 includes an incidence rate or the like of kernel detection by the sensing unit 29. A need for performance of a cleaning strategy may be determined from a reduction in incidence rate for the sensing unit 29 due to material obscuring the detection surface. For example, through comparison of the monitored incidence rate with a threshold incidence rate the need for performance of the cleaning strategy and/or initiation of performance of the cleaning strategy can be made. The threshold incidence rate may be predetermined, may be dependent on an average incidence rate for the sensing unit 29 and/or may be determined in dependence on an operator input.

In a variant, the location of the combine may additionally or alternatively be determined upon receipt of an operator input, e.g. at user interface 32. For example, an operator may be asked to press a button or otherwise interact with the user interface 32 associated with the agricultural machine to indicate when the machine has entered a headland of the working environment and hence indicate an appropriate time for performance of the cleaning strategy.

In a further variant, operational data may be received in the form of sensor data from one or more environment sensors associated with the combine. This may include one or more cameras or other vision based sensors configured for monitoring the environment of the combine. Through suitable processing of the image data obtained from such sensors, the location of the combine 50 with respect to the working environment can be determined. For instance, the position of a crop engaging component of the combine, e.g. the header 42, with respect to crop or other material in the working environment can be determined. Where the header 42 is determined to be spaced from the crop or other material then a determination may be made that the combine 50 is within a headland of the environment, or is otherwise not engaging crop within the environment, and as such a cleaning strategy may be performed without negatively impacting the overall working operation of the machine.

In a further variant, the operational parameter for the combine 50 includes a measure of a throughput of material in one or more material flowpaths within the combine. In an example, this includes a measured flow rate of material within the combine 50 determined through use of one or more throughput sensors positioned within said flowpath(s). Here, performance of a cleaning operation may be initiated based on the monitored flow rate being less than, or upon the monitored flow rate dropping below, a threshold flow rate, indicating the combine 50 being located within, or passing into, a headland of the working environment.

A further variant includes utilising a measure of a pitch, roll or tilt angle of the combine 50, indicative of an expected throughput of material through the combine 50.

Additional inputs may include the use of further crop parameters e.g. a moisture level associated with the material collected by the combine 50, a measure of a crop yield or throughput and/or one or more environmental parameters, which may include an ambient temperature, or a measure of a humidity level, for example, each of which being indicative of a likelihood of material build up on the detection surface of the sensing unit 29. Further inputs include one or more machine parameters, including the type of machine, size of machine, intended operational use for the machine, or component setup.

In the illustrated embodiment, the cleaning strategy specifically includes control of an airflow system 35 for the combine 50. The airflow system 35 includes one or more fans for inducing an airflow through the combine 50 and specifically through crop processing apparatus 40 as discussed herein. The cleaning strategy includes controlling an airflow generated by the airflow system 35, and specifically where an airflow generated by the airflow system 35 is increased to move or dislodge material from the detection surface of the sensing unit 29.

In a variant of the invention, the cleaning strategy extends to controlling operation of a crop processing mechanism of the combine, e.g. crop processing apparatus 40. In such embodiments, the cleaning strategy can include controlling an opening or the like associated with one or more operable components of the crop processing mechanism, e.g. a sieve opening. For example, an opening or openings associated with a sieve of the crop processing mechanism can be increased.

Control System

As discussed herein, a control system 1 is provided and configured to controlling operation of one or more operable components (e.g. airflow system 35, user interface 32) associated with a cleaning system for a sensing arrangement of an agricultural machine, here combine 50. In the illustrated embodiment the controllable components include an airflow system 35 for controlling an airflow through the combine 50 and specifically through a crop processing apparatus 40 of the combine 50, and a user interface 32 associated with the combine 50, e.g. provided as a display terminal of the combine 50 or as a handheld terminal to provide an indication of the operation of the cleaning system and/or to receive one or more operator inputs for controlling operation of the cleaning system in the manner described herein.

Figure 2:
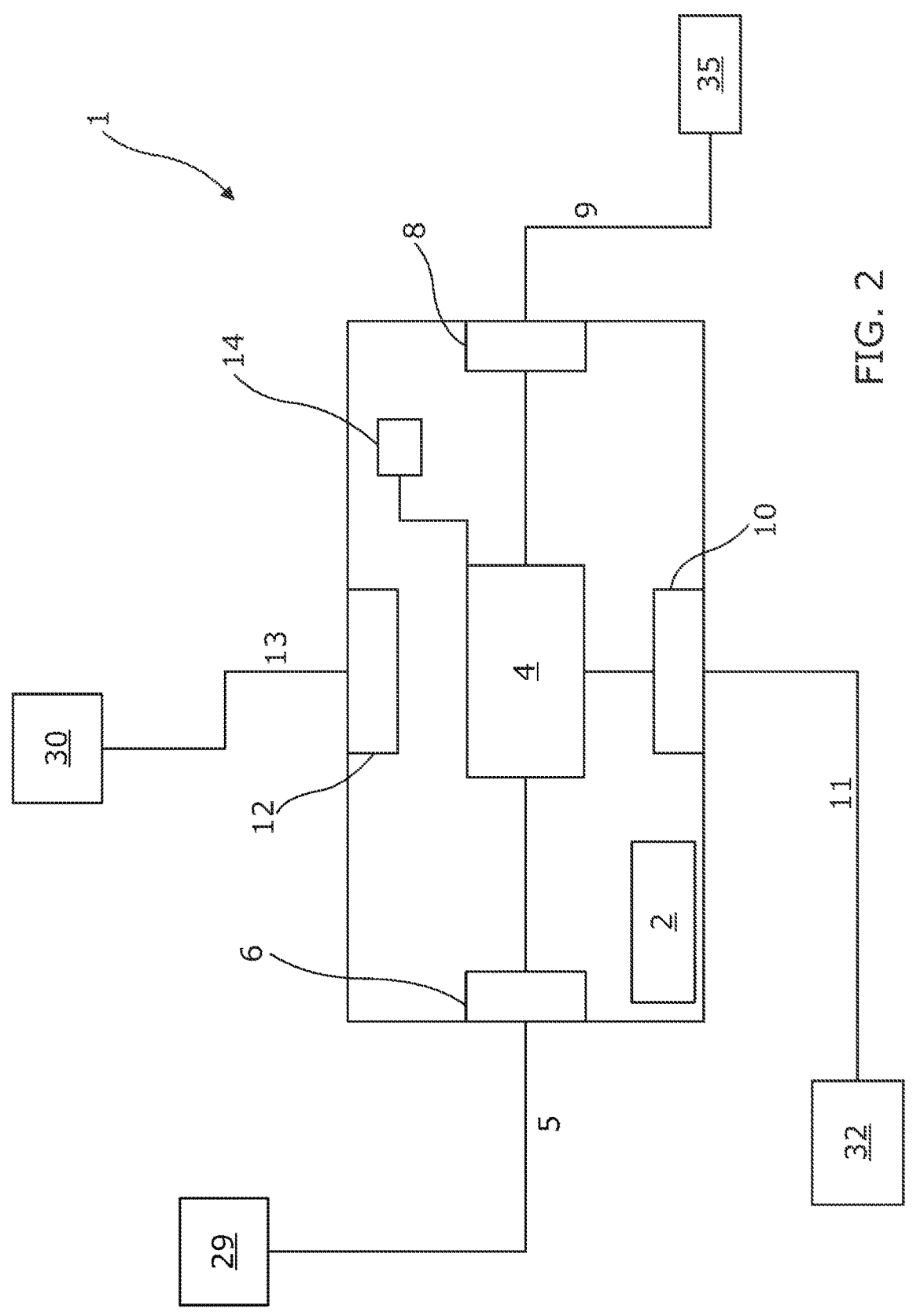
FIG. 2 is a schematic illustration of an embodiment of a control system of the present disclosure.

FIG. 2 illustrates the control system 1 further. As shown, control system 1 comprises a controller 2 having an electronic processor 4, electronic inputs 6, 12, electronic output 8 and electronic input/output 10. The processor 4 is operable to access a memory 14 of the controller 2 and execute instructions stored therein to perform the steps and functionality of the present invention discussed herein, e.g. by controlling the airflow system 35 to increase or decrease an airflow provided through the combine 50 in accordance with a determined cleaning strategy, and/or controlling a user interface 32 to display information indicative of the cleaning strategy (e.g. to indicate performance of the cleaning strategy, need to perform the cleaning strategy, etc.) or to receive an operator input for initiating performance of a cleaning strategy, through generation and output of one or more control signals.

Processor 4 is operable to receive via input 6 which, in the illustrated embodiment, takes the form of input signals 5 received from a control unit associated with the sensing unit 29 of sensing arrangement, data indicative of the operational output from the sensing unit 29. As discussed herein, in use, the sensing unit 29 is configured to measure an impact parameter indicative of a force and/or frequency of material incident on the detection surface. Accordingly, processor 4 is operable to receive via input 6 signals indicative of a measure of the force and/or frequency of impact of material incident on the detection surface. Utilising this data, the processor 4 is operable to analyse the data and determine therefrom a cleaning strategy for the sensing unit 29 in the manner discussed herein.

As described above, the controller 2 includes an electronic output 8 configured to output control signals 9 generated by the processor 4 for controlling operation of one or more operable components associated with the combine 50. Specifically, the processor 4 is operable to generate, and the controller 2 operable then to output via output 8, control signals 9 to an airflow system 35 of the combine 50 for causing performance of a cleaning strategy as determined in the manner discussed herein. In practice, this may include causing the airflow system to operate in accordance with a cleaning mode whereby an airflow speed induced by the airflow system 35 is increased in order to dislodge or remove material which is on or otherwise blocking or obscuring the detection surface of the sensing unit 29.

Controller 2 additionally includes an input 12 for receiving data indicative of a position of the combine 50 within a working environment. In the illustrated embodiment, this comprises use of a positioning module 30 associated with the combine 50 and operable in combination with the processor 4 (e.g. in the manner described herein) to determine a position of the combine 50. This may be utilised by the processor 4 to determine the cleaning strategy for the sensing arrangement. In practice, this involves initiating performance of the cleaning strategy, e.g. by increasing an airflow through the combine, in dependence on the position of the combine 50. Advantageously, utilising position module 30 the processor 4 can determine and initiate performance of the cleaning strategy at an appropriate location within a working environment, e.g. in a headland of the environment, which has no or a minimal impact on the overall harvesting process—i.e. when there is no or a reduced level of crop material being processed by the combine 50.

Input/output 10 is operably connected to user interface 32. Control system 1 is operable to control operation of the user interface 32, e.g. through output of control signals 11 in order to display data to an operator of the combine 50 indicative of the cleaning strategy determined by processor 4. As discussed herein, this can include providing an indication to the operator of performance of the cleaning strategy (i.e. which may have been automated by the control system 1), a need for performance of the cleaning strategy (e.g. through monitoring of the input signals 5 received from sensing unit 29), or a prompt for the operator to initiate performance of the cleaning strategy (e.g. where the control system 1 has determined in dependence on the data received from positioning module 30 that the combine 50 is located within a headland of the working environment. Input/output 10 is additionally configured to receive input signals 11 from the user interface 32 indicative of an operator input at the user interface 32 in relation to the cleaning strategy. This may include an operator requesting performance of the cleaning strategy, e.g. in dependence on a prompt provided by the control system 1 at the user interface 32 or on an ad-hoc basis by the operator.

Method

Figure 3:
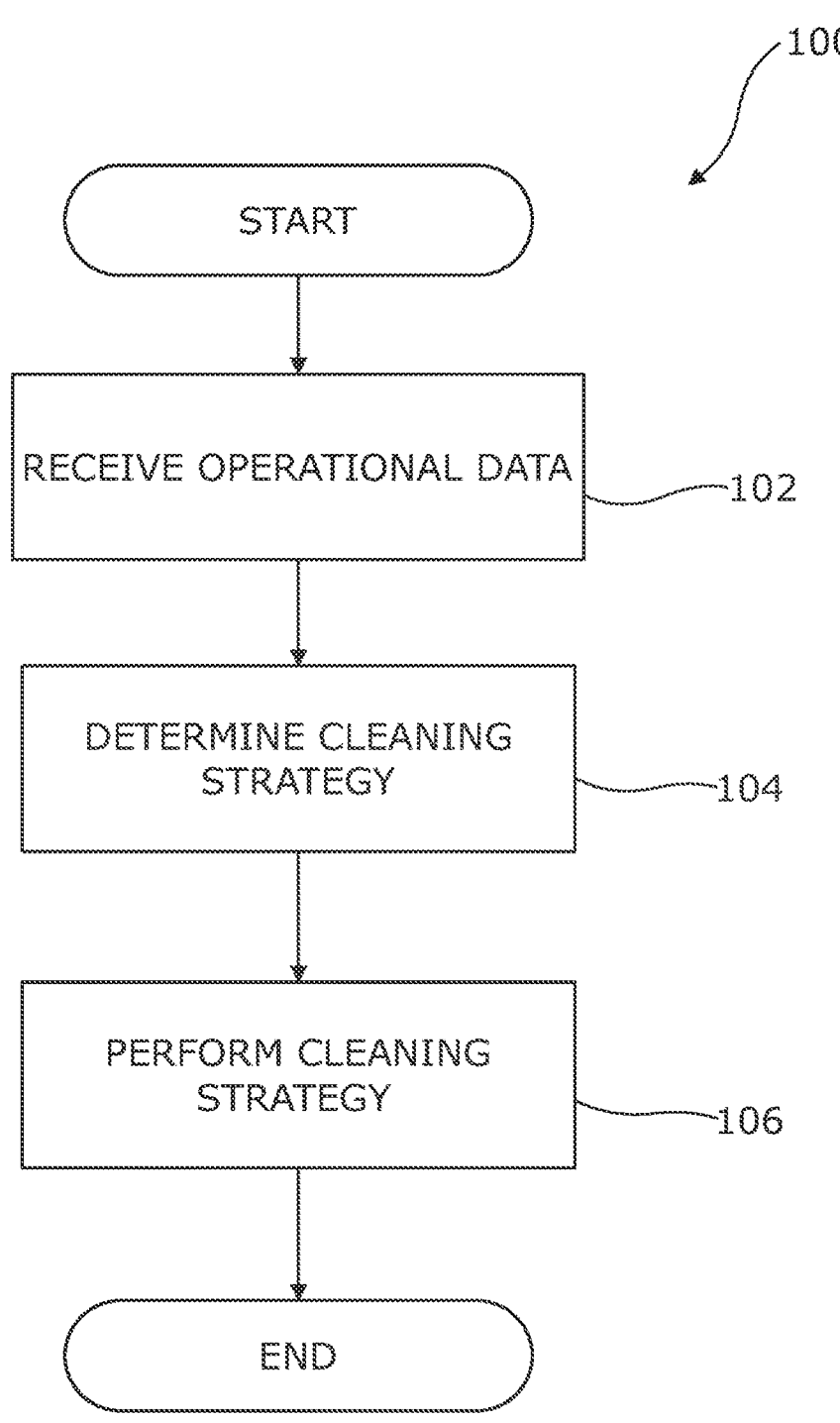
FIG. 3 is a flowchart illustrating an embodiment of a method of the present disclosure.

FIG. 3 illustrates a method 100 in accordance with the present disclosure. Method 100 comprises, at step 102, receiving operational data indicative of an output from the sensing arrangement (e.g. sensing unit 29) and/or an operational parameter for the combine 50. At step 104, a cleaning strategy for a cleaning system of the sensing arrangement in determined in dependence on the received operational data, in the manner discussed herein. At step 106, control signals are generated and output for controlling one or more operable components (e.g. user interface 32, airflow system 35) associated with the cleaning system for controlling the cleaning system in accordance with the cleaning strategy.

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as set out herein and a machine readable storage storing such a program. Still further, embodiments of the present invention may be conveyed electronically via any medium such as a communication signal carried over a wired or wireless connection and embodiments suitably encompass the same.

All references cited herein are incorporated herein in their entireties. If there is a conflict between definitions herein and in an incorporated reference, the definition herein shall control.

What is claimed is:

1. A control system for a sensing arrangement of an agricultural machine, the control system comprising one or more controllers, and being configured to:

12 receive operational data indicative of an output from the sensing arrangement and/or an operational parameter for the agricultural machine, the operational parameter for the machine comprising a location of the machine within a working environment;

determine, in dependence on the received operational data, a cleaning strategy for a cleaning system of the sensing arrangement;

generate and output a control signal for controlling one or more operable components associated with the cleaning system for controlling the cleaning system in accordance with the cleaning strategy; and control performance of a cleaning operation for the sensing arrangement in dependence on the machine being located within a headland of the working environment, wherein the cleaning strategy comprises controlling operation of the one or more operable components in a manner so as to reduce a build-up of material on a surface of the sensing arrangement.

2. A control system as claimed in claim 1, wherein the sensing arrangement comprises a grain loss sensor.

3. A control system as claimed in claim 1, wherein:

the one or more operable components comprise an airflow system for the machine; and the cleaning strategy comprises controlling an airflow generated by the airflow system.

4. A control system as claimed in claim 1, wherein:

the one or more operable components comprise a crop processing mechanism of the machine; and the cleaning strategy comprises controlling an opening er the like associated with one or more operable components of the crop processing mechanism.

5. A control system as claimed in claim 1, configured to receive the operational data in the form of sensor data from one or more environment sensors associated with the machine.

6. A control system as claimed in claim 5, comprising or being operably connected to an image processing module for determining, from the sensor data received from the one or more environment sensors, the location of the machine with respect to the working environment.

7. A control system for a sensing arrangement of an agricultural machine, the control system comprising one or more controllers and being configured to:

receive operational data indicative of an output from the sensing arrangement and/or an operational parameter for the agricultural machine, the operational parameter for the machine comprising a measure of a throughput of material in one or more material flowpaths within the machine, wherein the measure of the throughput comprises a flow rate of material within the machine;

determine, in dependence on the received operational data, a cleaning strategy for a cleaning system of the sensing arrangement; and generate and output a control signal for controlling one or more operable components associated with the cleaning system for controlling the cleaning system in accordance with the cleaning strategy, wherein the cleaning strategy comprises controlling operation of the one or more operable components in a manner so as to reduce a build-up of material on a surface of the sensing arrangement, and wherein the control system is configured to:

compare the measured flow rate with a threshold flow rate; and determine the cleaning strategy in dependence thereon.

8. A control system as claimed in claim 1, wherein the operational parameter for the machine comprises a measure of a pitch, roll or tilt angle of the machine.

9. A control system of claim 1, configured to monitor the output of the sensing arrangement and to determine a need for performance of the cleaning strategy in dependence on that output.

10. A control system as claimed in claim 1, operable to receive sensor data from one or more further sensors monitoring one or more further crop parameters.

11. A control system as claimed in claim 1, operable to determine the cleaning strategy for the sensor arrangement in dependence on one or more environmental parameters.

12. A control system as claimed in claim 1, configured to automate performance of the cleaning strategy in dependence on one or more operating conditions being met.

13. A control system as claimed in claim 1, wherein the one or more operable components comprise a user interface for providing an indication to an operator of the machine of a need or suggestion to perform the cleaning strategy.

14. A cleaning system for a sensing arrangement of an agricultural vehicle comprising and/or being controllable by the control system of claim 1.

15. A sensing arrangement comprising one or more sensor units and the cleaning system of claim 14.

16. An agricultural machine comprising the cleaning system of claim 14.

17. A method of controlling a cleaning system for a sensing arrangement of an agricultural machine, comprising:
  receiving operational data indicative of an output from the sensing arrangement and/or an operational parameter for the agricultural machine, the operational parameter for the machine comprising a location of the machine within a working environment;

determining, in dependence on the received operational data, a cleaning strategy for the cleaning system of the sensing arrangement;
  controlling one or more operable components associated with the cleaning system for controlling the cleaning system in accordance with the cleaning strategy; and
  controlling performance of a cleaning operation for the sensing arrangement in dependence on the machine being located within a headland of the working environment,
  wherein the cleaning strategy comprises controlling operation of the one or more operable components in a manner so as to reduce a build-up of material on a surface of the sensing arrangement.

18. A method of controlling a cleaning system for a sensing arrangement of an agricultural machine, comprising:
  receiving operational data indicative of an output from the sensing arrangement and/or an operational parameter for the agricultural machine, the operational parameter for the machine comprising a measure of a throughput of material in one or more material flowpaths within the machine, wherein the measure of throughput comprises a flow rate of material within the machine;
  determining, in dependence on the received operational data, a cleaning strategy for the cleaning system of the sensing arrangement, wherein determining the cleaning strategy includes comparing the flow rate with a threshold flow rate; and
  controlling one or more operable components associated with the cleaning system for controlling the cleaning system in accordance with the cleaning strategy,
  wherein the cleaning strategy comprises controlling operation of the one or more operable components in a manner so as to reduce a build-up of material on a surface of the sensing arrangement.

* * * * *